UNITED STATES PATENT OFFICE.

LOUIS CLÉMENT, OF PARIS, AND CLÉRY RIVIÈRE, OF PANTIN, NEAR PARIS, FRANCE, ASSIGNORS TO ACTIEN GESELLSCHAFT FUR ANILIN FABRIKATION, OF BERLIN, GERMANY.

PROCESS OF PRODUCING COATING COMPOSITIONS OF ACETYL CELLULOSE.

1,173,931.  Specification of Letters Patent.  Patented Feb. 29, 1916.

No Drawing.  Application filed November 3, 1913. Serial No. 798,999.

*To all whom it may concern:*

Be it known that we, LOUIS CLÉMENT and CLÉRY RIVIÈRE, citizens of the French Republic, residing at Paris and Pantin, near Paris, French Republic, (our post-office addresses being, respectively, 231 Rue Lafayette, Paris, French Republic, and 6 Rue Etienne-Marcel, Pantin, near Paris, French Republic,) have invented certain new and useful Improvements in Processes of Producing Coating Compositions of Acetyl Cellulose, of which the following is a specification.

The invention is directed to a new process of producing coating compositions of acetyl-cellulose employing as solvents a mixture of acetylene-tetrachlorid and a substance which enhances the solving power of acetylene-tetrachlorid for the ester and evaporates uniformly with acetylene-tetrachlorid.

A very usual solvent for cellulose esters, particularly acetyl-cellulose, is acetylene tetrachlorid, to which methyl or ethyl alcohol must be added to increase its power of dissolving cellulose esters, particularly most varieties of acetyl-cellulose. When this mixture of solvents is used and the solution is applied for producing by machinery coatings on materials (for instance, in making artificial leather, varnished leather, pegamoid or fabrics for aeroplanes), there is the objection that the alcohol evaporates first and the remaining semi-solid mass can no longer be sufficiently uniformly distributed over the material, because acetylene tetrachlorid alone has not a sufficient solvent power for the cellulose ester. The present invention overcomes this objection by adding to the acetylene tetrachlorid a substance which, like methyl alcohol or ethyl alcohol, enhances the solvent capacity of the acetylene tetrachlorid, but in contrast with these alcohols does not evaporate more rapidly than acetylene tetrachlorid, but evaporates uniformly therewith. As additions of this kind amyl alcohol is best and substances containing amyl alcohol, like fusel oil, are also suitable. For example, acetyl-cellulose may be dissolved in a mixture of 90 parts by weight of acetylene tetrachlorid and 10 parts by weight of amyl alcohol, which mixture has a surprising power of dissolving acetyl-cellulose. In coating materials with this solution the two constituents of the solvent evaporate together, the acetyl-cellulose remains in solution throughout the operation and in consequence the coating is distributed very uniformly over the material.

Instead of the aforesaid proportion of acetylene tetrachlorid to amyl alcohol in the mixture, other proportions may be used; so also fusel oil, for example, may be substituted for the amyl alcohol. The method may also be adopted for the feebly nitrogenized acetyl-celluloses (nitro-acetyl-celluloses) recently brought into commerce.

Having now described the nature of our said invention and the best means we know of carrying the same into practical effect, we claim:—

1. In a process for producing coatings of cellulose ester the step which consists in dissolving cellulose ester in a mixture of acetylene tetrachlorid and a substance which enhances the solvent power of acetylene tetrachlorid for the ester and evaporates uniformly with the acetylene tetrachlorid.

2. In a process for producing coatings of acetyl-cellulose, the step which consists in dissolving the acetyl-cellulose in a mixture of acetylene tetrachlorid and a substance containing amyl alcohol.

3. In a process for producing coatings of acetyl-cellulose, the step which consists in dissolving the acetyl-cellulose in a mixture of acetylene tetrachlorid and amyl alcohol.

4. In a process for producing coatings of acetyl-cellulose, the step which consists in dissolving the acetyl-cellulose in a mixture of 90 parts by weight of acetylene tetrachlorid and 10 parts by weight of amyl alcohol.

In testimony whereof we have hereunto set our hands in presence of two subscribing witnesses.

LOUIS CLÉMENT.
CLÉRY RIVIÈRE.

Witnesses:
HANSON C. COXE,
CHARLES G. LOELE.